(12) United States Patent
Sun

(10) Patent No.: US 8,406,010 B2
(45) Date of Patent: Mar. 26, 2013

(54) FIXING APPARATUS FOR ELECTRONIC DEVICE

(75) Inventor: Zheng-Heng Sun, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 97 days.

(21) Appl. No.: 13/048,884

(22) Filed: Mar. 16, 2011

(65) Prior Publication Data

US 2012/0170235 A1 Jul. 5, 2012

(30) Foreign Application Priority Data

Dec. 30, 2010 (CN) .......................... 2010 1 0615253

(51) Int. Cl.
*H05K 7/02* (2006.01)
*H05K 7/04* (2006.01)

(52) U.S. Cl. ...................................... 361/807

(58) Field of Classification Search .................. 361/807, 361/810, 726, 759, 799; 439/547; 174/138 D
See application file for complete search history.

(56) References Cited

U.S. PATENT DOCUMENTS

| | | | | |
|---|---|---|---|---|
| 3,996,500 A * | 12/1976 | Coules | | 361/748 |
| 5,452,184 A * | 9/1995 | Scholder et al. | | 361/799 |
| 6,424,540 B1 * | 7/2002 | Chen et al. | | 361/759 |
| 6,470,556 B2 * | 10/2002 | Boe | | 29/450 |
| 6,964,581 B2 * | 11/2005 | Chen et al. | | 439/547 |
| 7,085,141 B2 * | 8/2006 | Yi | | 361/804 |
| 7,184,277 B2 * | 2/2007 | Beirne | | 361/807 |
| 7,254,037 B2 * | 8/2007 | Chen et al. | | 361/726 |
| 7,391,619 B1 * | 6/2008 | Lee | | 361/759 |
| 7,430,129 B1 * | 9/2008 | Peng | | 361/807 |
| 7,486,523 B2 * | 2/2009 | Wu et al. | | 361/747 |
| 2004/0125575 A1 * | 7/2004 | Chen et al. | | 361/759 |
| 2007/0035934 A1 * | 2/2007 | Jiang et al. | | 361/759 |
| 2007/0064404 A1 * | 3/2007 | Dean | | 361/810 |
| 2007/0236906 A1 * | 10/2007 | Hsu | | 361/810 |
| 2009/0080171 A1 * | 3/2009 | Peng | | 361/807 |
| 2009/0180264 A1 * | 7/2009 | Chiang | | 361/752 |
| 2010/0073889 A1 * | 3/2010 | Olson | | 361/752 |

* cited by examiner

*Primary Examiner* — Lisa Lea Edmonds
*Assistant Examiner* — Xanthia C Cunningham
(74) *Attorney, Agent, or Firm* — Altis Law Group, Inc.

(57) ABSTRACT

A fixing apparatus includes a bottom wall, a circuit board, and a supporting member. The circuit board is mounted on the bottom wall, with a space defined between the circuit board and the bottom wall. A connector is installed on the circuit board adjacent to an end of the circuit board, to be electrically connected to the electronic device. The supporting member is supported on the bottom wall. A first end of the supporting member is inserted into the space between the circuit board and the bottom wall, and engages with the circuit board. A second end of the supporting member is exposed out of the end of the circuit board adjacent to the connector, to support the electronic device.

4 Claims, 2 Drawing Sheets

FIXING APPARATUS FOR ELECTRONIC DEVICE

BACKGROUND

1. Technical Field

The present disclosure relates to a fixing apparatus for an electronic device.

2. Description of Related Art

Many electronic devices, such as embedded universal serial bus (eUSB) devices, are installed on circuit boards. However, even though the electronic device may only use a little space at their connection points, space between the electronic device and the circuit board will be wasted because the distance between the electronic device and the circuit board is too small, meaning that all but devices with the low profiles are excluded from being installed on the circuit board below the electronic device.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawing, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
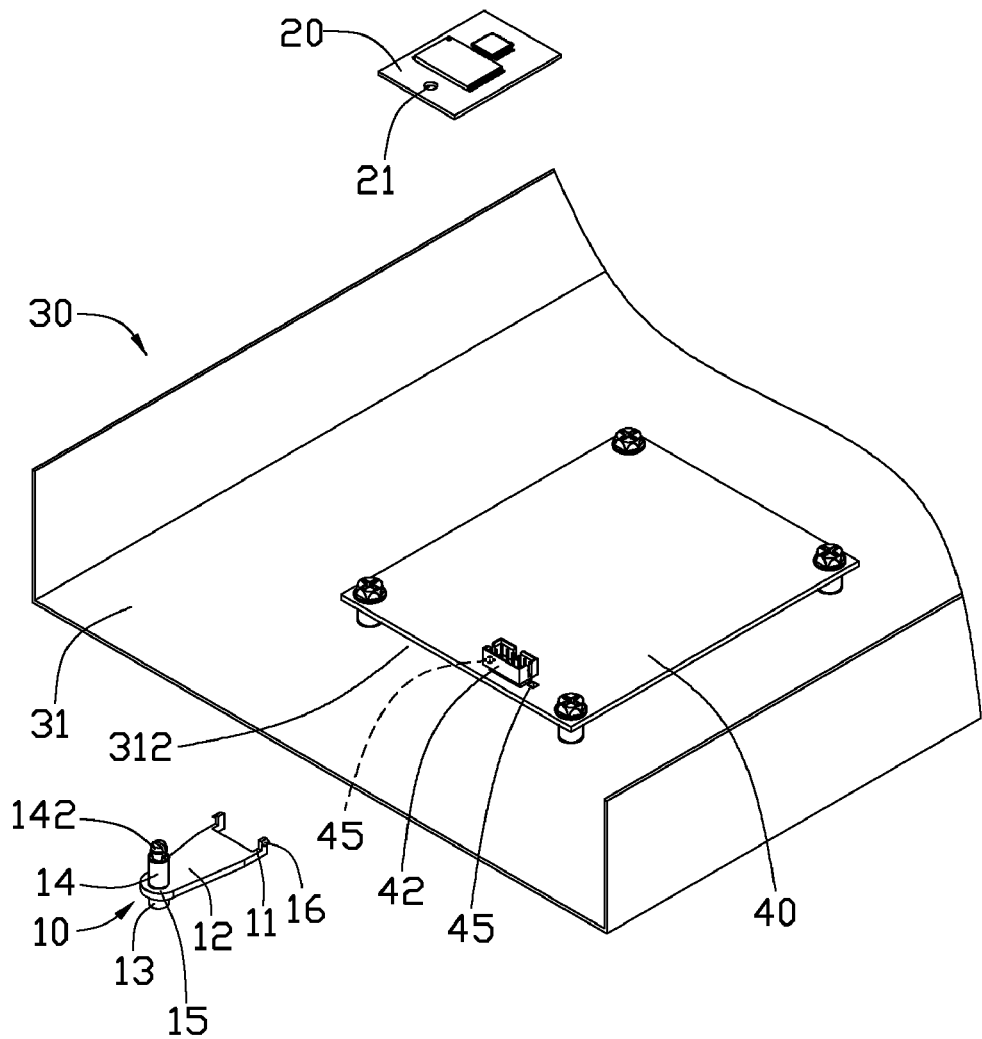
FIG. 1 is an exploded, isometric view of an embodiment of a fixing apparatus together with an electronic device.

Referring to FIG. 1, an embodiment of a fixing apparatus is provided to fix an electronic device 20 to a body such as a circuit board 40. The fixing apparatus includes a bottom wall 31, the circuit board 40, and a supporting member 10. In this embodiment, the electronic device 20 is an embedded universal serial bus (eUSB) device. A through hole 21 is defined in the electronic device 20, adjacent to an end of the electronic device 20.

The supporting member 10 includes a plate 12. Two spaced hooks 16 extend up from a first end 11 of the plate 12. A supporting foot 13 perpendicularly extends down from a second end 15 of the plate 12 opposite to the first end 11. A post 14 perpendicularly extends up from the second end 15 of the plate 12. Two spaced resilient hooking arms 142 extend up from a top of the post 14.

The bottom wall 31 is a part of a chassis 30 of a computer. The circuit board 40 is mounted on the bottom wall 31, and a space 312 is defined between the circuit board 40 and the bottom wall 31. Two spaced slots 45 are defined in the circuit board 40, adjacent to an end of the circuit board 40. A connector 42 is installed on the circuit board 40 between the slots 45, to be electrically connected to the electronic device 20. In this embodiment, the connector 42 is a eUSB connector.

Figure 2:
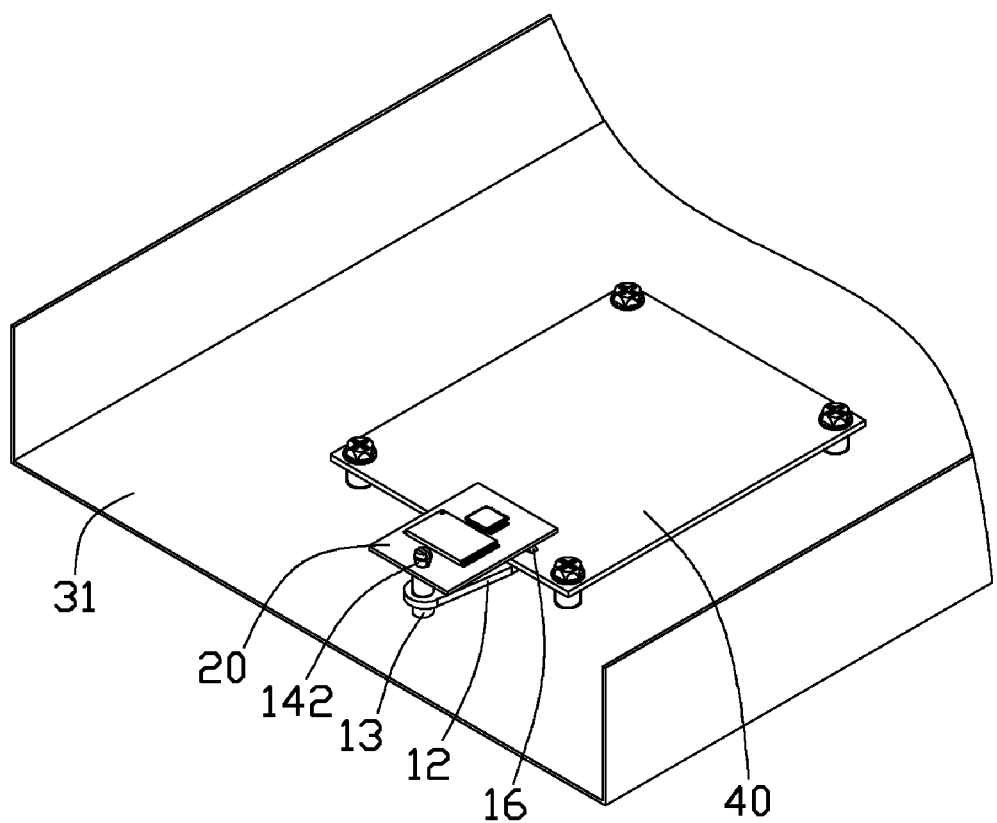
FIG. 2 is an assembled, isometric view of FIG. 1.

Referring to FIG. 2, in assembly, the first end 11 of the plate 12 of the supporting member 10 is inserted into the space 312 between the circuit board 40 and the bottom wall 31. The hooks 16 of the supporting member 10 are extended through the slots 45 and engage with a top of the circuit board 40. The second end 15 of the plate 12 of the supporting member 10 is exposed out of the end of the circuit board 40 adjacent to the connector 42, with the supporting foot 13 supported by the bottom wall 31. Thereby, the supporting member 10 is fixed on the bottom wall 31. The electronic device 20 is placed on the supporting member 10 and the connector 42, with a connector (not shown) on a bottom side of the electronic device 20 aligning with the connector 42 of the circuit board 40, and the through hole 21 of the electronic device 20 aligning with the hooking arms 142 of the post 14 of the supporting member 10. The electronic device 20 is pressed down and connected to the connector 42 of the circuit board 40 with the connector of the electronic device 20. The hooking arms 142 of the post 14 are deformed to extend through the through hole 21 of the electronic device 20. After extending through the through hole 21, the hooking arms 142 restore and engage with a top of the electronic device 20. The electronic device 20 is supported on the post 14. Thereby, the electronic device 20 is fixed to the circuit board 40. In this embodiment, only a part of the electronic device 20 is fixed over the circuit board 40, which occupies less space of the circuit board 40.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. An electronic device fixing apparatus, comprising:
   an electronic device;
   a bottom wall;
   a circuit board mounted on the bottom wall, with a space defined between the circuit board and the bottom wall, a connector installed on the circuit board adjacent to an end of the circuit board, to be electrically connected to the electronic device; and
   a supporting member supported on the bottom wall, wherein a first end of the supporting member is inserted into the space between the circuit board and the bottom wall, and engages with the circuit board, a second end of the supporting member is exposed out of the end of the circuit board adjacent to the connector, to support the electronic device on the second end of the supporting member.

2. The electronic device fixing apparatus of claim 1, wherein two slots are defined in the circuit board adjacent to the connector, the supporting member comprises a plate, two hooks extend up from a first end of the plate, to extend through the corresponding slots and engage with a top of the circuit board.

3. The electronic device fixing apparatus of claim 2, wherein a supporting foot extends down from a second end of the plate, to support the plate on the bottom wall.

4. The electronic device fixing apparatus of claim 2, wherein a post extends up from a second end of the plate to support the electronic device, and two spaced resilient hooking arms extend up from a top of the post, for extending through a through hole of the electronic device and engage with a top of the electronic device.

* * * * *